US011514718B2

(12) United States Patent
Chen (10) Patent No.: US 11,514,718 B2
(45) Date of Patent: Nov. 29, 2022

(54) HUMAN FACE IDENTIFICATION APPARATUS, DISTRIBUTED HUMAN FACE IDENTIFICATION SYSTEM AND METHOD THEREOF

(71) Applicant: QNAP Systems, Inc., New Taipei (TW)

(72) Inventor: Chun-Yen Chen, New Taipei (TW)

(73) Assignee: QNAP Systems, Inc., New Taipei (TW)

(*) Notice: Subject to any disclaimer, the term of this patent is extended or adjusted under 35 U.S.C. 154(b) by 149 days.

(21) Appl. No.: 17/202,397

(22) Filed: Mar. 16, 2021

(65) Prior Publication Data

US 2022/0180089 A1 Jun. 9, 2022

(30) Foreign Application Priority Data

Dec. 4, 2020 (TW) .................................. 109142811

(51) Int. Cl.
*G06V 40/16* (2022.01)
*G06F 21/32* (2013.01)
*G06V 40/50* (2022.01)

(52) U.S. Cl.
CPC ............ *G06V 40/172* (2022.01); *G06F 21/32* (2013.01); *G06V 40/167* (2022.01); *G06V 40/50* (2022.01); *G06F 2221/2137* (2013.01); *G06F 2221/2143* (2013.01)

(58) Field of Classification Search
CPC .... G06V 40/172; G06V 40/167; G06V 40/50; G06F 21/32; G06F 2221/2137; G06F 2221/2143
See application file for complete search history.

(56) References Cited

U.S. PATENT DOCUMENTS

2020/0275017 A1\* 8/2020 Lee .......................... G06T 7/579

FOREIGN PATENT DOCUMENTS

CN 112329666 A \* 2/2021

\* cited by examiner

*Primary Examiner* — Edward F Urban
*Assistant Examiner* — Wassim Mahrouka
(74) *Attorney, Agent, or Firm* — Amin, Turocy & Watson, LLP (57) ABSTRACT

A human face identification apparatus, a distributed human face identification system and a corresponding method are provided. The method includes obtaining a human face block from an image, identifying a data of a person corresponding to the human face block according to a client database by a client apparatus, controlling the client apparatus to transmit the human face block to a server apparatus and controlling the server apparatus to identify the human face block according to a server database when the data of the person corresponding to the human face block cannot be identified by the client apparatus, and copying the data of the person corresponding to the human face block from the server database to the client database when the data of the person is identified according to the server database by the server apparatus.

20 Claims, 2 Drawing Sheets

HUMAN FACE IDENTIFICATION APPARATUS, DISTRIBUTED HUMAN FACE IDENTIFICATION SYSTEM AND METHOD THEREOF

BACKGROUND

1. Technical Field

The present disclosure relates to a face identification technology. In particular, the present disclosure relates to a human face identification apparatus, a distributed human face identification system and a corresponding method.

2. Description of Related Art

Some of the existing human face identification systems use a single apparatus processing approach. In such a one-to-one human face identification system, an apparatus in charge of human face identification processing is connected to a camera and performs human face identification operations on the images provided by the camera. However, since this single apparatus processing approach is very wasteful of hardware resources, the one-to-many human face identification system composed of an apparatus in charge of human face identification processing and several cameras is more commonly used. In the one-to-many human face identification system, a server can perform human face identification operations on image streams provided by multiple cameras in a time division manner. Since only one server for image processing is sufficient to process the image streams from multiple cameras at the same time, the one-to-many human face identification system can make full use of the computing power of each server, thereby reducing the waste caused by idle hardware resources.

However, since the server must process multiple image streams at the same time, when building a one-to-many human face identification system, not only a server with extremely high computing power is required, but also a network with high transmission speed is required to transmit all image streams to meet the system requirements, which imposes a lot of restrictions on promotion and application of human face identification systems.

SUMMARY

A distributed human face identification system is provided. The distributed human face identification system includes a server and at least one human face identification apparatus. The server stores at least one server human face identification data. Each of the server human face identification data corresponds to a data of a server registered person. The server is connected to each human face identification apparatus so that data transfer operations can be completed between the server and the human face identification apparatuses. Each human face identification apparatus includes a database, an image capture unit, a human face identification unit, and a processing unit. The database stores at least one client human face identification data. Each of the client human face identification data corresponds to a data of a client registered person. The image capture unit generates an image stream based on images obtained from a video of a specific area in a continuous time period. The human face identification unit is connected to the image capture unit to receive the image stream. The human face identification unit detects whether each image includes a human face block, determines the human face blocks belonging to a same identification object, and performs human face identification on the human face blocks belonging to the same identification object to generate a corresponding validating human face identification data. The processing unit is connected to the database to obtain the client human face identification data and connected to the human face identification unit to receive the validating human face identification data and the image stream. The processing unit compares the validating human face identification data with the client human face identification data. The processing unit sends an output when finding that a similarity value between the validating human face identification data and one of the client human face identification data exceeds a client threshold, and transmits the at least one human face block to the server when the similarity value between the validating human face identification data and each client human face identification data does not exceed the client threshold. The server performs human face identification on the received human face block to generate a reference human face identification data and compares the reference human face identification data with the server human face identification data, and then transmits a comparison result. Finally, the human face identification apparatus generates an output according to the comparison result obtained therefrom.

In an embodiment, when a similarity value between the reference human face identification data and any one of the server human face identification data exceeds a server threshold, the comparison result further includes the data of the server registered person corresponding to that server human face identification data, and the human face identification apparatus stores the data of the server registered person included in the comparison result in the database.

In an embodiment, the data of the server registered person includes a face image of the server registered person.

In an embodiment, the human face identification apparatus deletes the data of the server registered person stored in the database after a preset period of time after the human face identification apparatus stores the data of the server registered person included in the comparison result in the database.

In an embodiment, when a similarity value between the reference human face identification data and each of the server human face identification data does not exceed a server threshold, the human face identification apparatus stores the validating human face identification data in the database according to the comparison result to become one of the client human face identification data, and the validating human face identification data stored in the database is associated with the corresponding human face block and a stranger number. Further, the stranger number is included in the comparison result.

In an embodiment, after the human face identification apparatus stores the validating human face identification data in the database to become one of the client human face identification data, the human face identification apparatus further deletes the validating human face identification data stored in the database after a preset period of time.

In an embodiment, the at least one human face identification apparatus further comprises a first human face identification apparatus and a second human face identification apparatus, wherein the first human face identification apparatus and the second human face identification apparatus are the same or different apparatus. Further, the first human face identification apparatus comprises a first database, a first image capture unit, a first human face identification unit, and a first processing unit, and the second human face identification apparatus comprises a second database, a second image capture unit, a second human face identification unit, and a second processing unit, wherein the first human face identification unit comprises a first algorithm and the second human face identification unit comprises a second algorithm, and the first algorithm and the second algorithm are the same or different.

A human face identification apparatus is provided, which is applicable and suitable for connecting with a server. The server stores at least one server human face identification data. Each of the server human face identification data corresponds to a data of a server registered person. The human face identification apparatus includes a database, an image capture unit, a human face identification unit, and a processing unit. The database stores at least one client human face identification data. Each of the client human face identification data corresponds to a data of a client registered person. The image capture unit generates an image stream based on images obtained from a video of a specific area in a continuous time period. The human face identification unit is connected to the image capture unit to receive the image stream. The human face identification unit detects whether each of the images includes a human face block, determines the human face blocks belonging to a same identification object, and performs human face identification on the human face blocks belonging to the same identification object to generate a corresponding validating human face identification data. The processing unit is connected to the database to obtain the client human face identification data and connected to the human face identification unit to receive the validating human face identification data and the image stream. The processing unit compares the validating human face identification data with the client human face identification data. When a similarity value between the validating human face identification data and one of the client human face identification data exceeds a client threshold, the processing unit sends an output. On the other hand, when the similarity value between the validating human face identification data and each of the client human face identification data does not exceed the client threshold, the processing unit transmits one of the at least one human face block to the server, and determines the output according to a comparison result generated by the server.

A distributed human face identification method is provided, including: obtaining a human face block from an image; identifying the human face block according to a client database in a client apparatus; when a data of a person corresponding to the human face block cannot be identified according to the client database, transmitting the human face block to a server apparatus; identifying the human face block according to a server database in the server apparatus; and when the server apparatus identifies the data of the person corresponding to the human face block according to the server database, copying and storing the data of the person in the client database.

In an embodiment, when the server apparatus cannot identify the data of the person corresponding to the human face block according to the server database, the client apparatus associates a content of the human face block with a stranger number.

In an embodiment, after a preset period of time after copying and storing the data of the person in the client database, the method further deletes the copied data of the person from the client database.

Based on the aforementioned technology, the human face identification apparatus, the distributed human face identification system and the corresponding method provided by the present disclosure adopt multi-stage identification operations, so that each place where a human face identification apparatus is set up can use the local database for human face identification, and the server joins the human face identification operation only when the human face identification apparatus cannot perform effective identification. Therefore, the requirements of the server for working capacity and network transmission speed can be reduced. Also, the human face identification apparatus, the distributed human face identification system and the corresponding method provided by the present disclosure can reduce the computing capability of the server and the network transmission rate required by human face identification operations by decentralizing the computing requirements.

BRIEF DESCRIPTION OF THE DRAWINGS

The present disclosure can be more fully understood by reading the following descriptions of the embodiments, with reference made to the accompanying drawings.

DETAILED DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
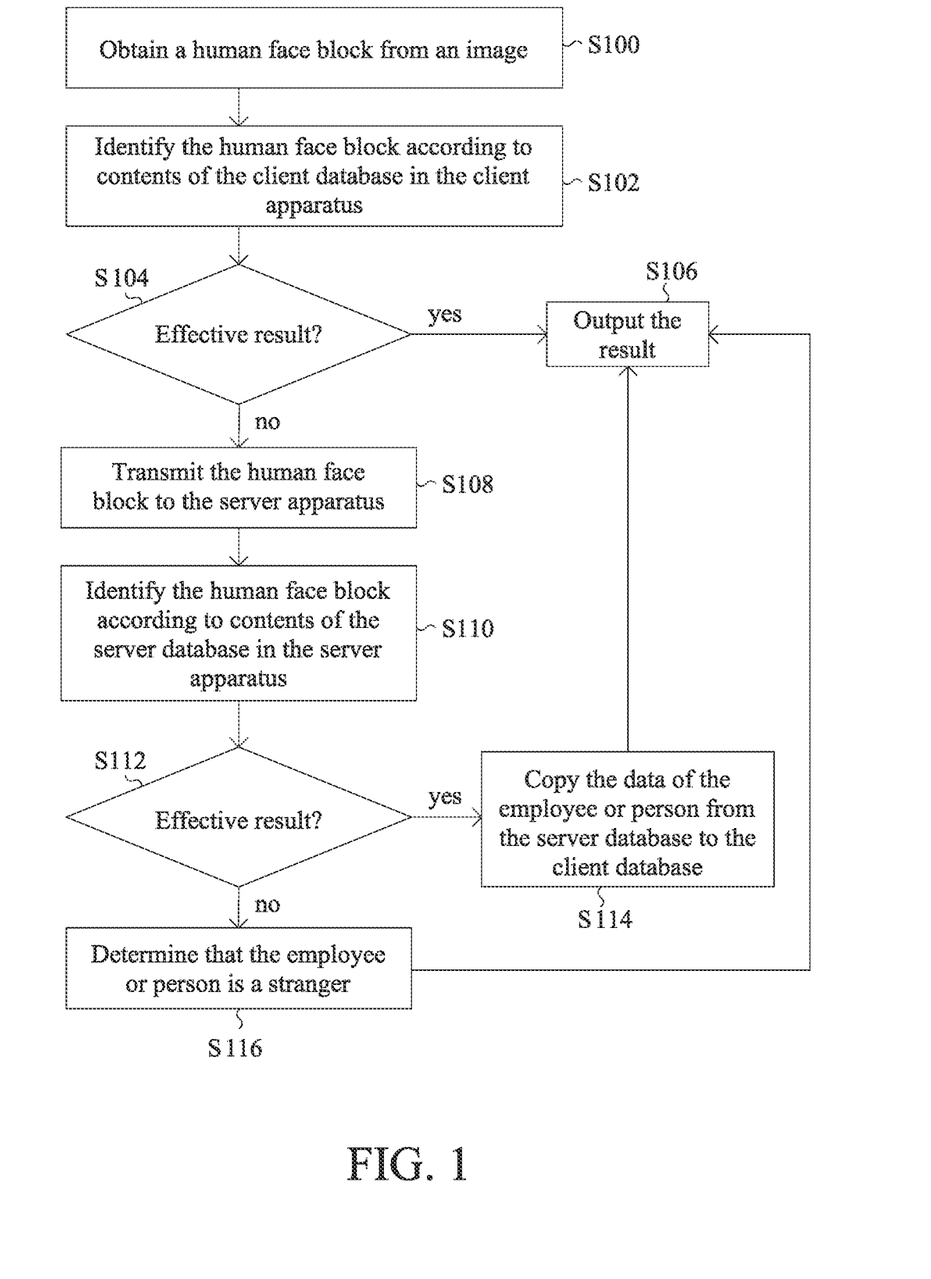
FIG. 1 is a flow chart of a distributed human face identification method according to an embodiment of the present disclosure.

Please refer to FIG. 1, which is a flow chart of a distributed human face identification method according to an embodiment of the present disclosure. In this embodiment, first, the client apparatus obtains an image, and obtains a human face block related to a human face from the image (step S100). Next, the client apparatus performs a human face identification operation on the human face block (step S102) according to pre-stored contents of the client database (such as image features or face images). Among them, the client database includes contents corresponding to each registered employee or person (for example, face images of the registered employees or people or image features extracted from the face images of the registered employees or people). During the human face identification operation, image features obtained from the human face block are compared with the contents in the client database. After the comparison, as long as the image features of the human face block are highly similar to any one content in the client database (for example, 85% or 90% similar), it can be determined that the human face appearing in the human face block is the face of the registered employee or person related to this one content (that is, the human face identification can obtain an effective result). On the contrary, if the image features obtained from the human face block are not highly similar to any content in the client database, then it can be determined that the human face appearing in the human face block is not related to the registered employees or people registered in the client database, and this also means that the human face identification cannot obtain an effective result.

When performing the human face identification operations in step S102, the client apparatus can also check whether the human face identification operations obtain an effective result (step S104), and output the result when an effective result is obtained (step S106), or transmit the human face block to the server apparatus when no effective result is obtained (step S108). It should be noted that, in this embodiment, the client apparatus starts to determine whether an effective result is obtained after comparing the human face block with all the contents in the client database, but the present disclosure is not limited thereto. For example, the client apparatus can also determine whether an effective result is obtained each time the human face block is compared with a data in the client database, and after confirming that an effective result is obtained, the client apparatus directly executes step S106, and when all the data are compared and no effective result is obtained, the flow proceeds to step S108.

After the human face block is transmitted to the server apparatus through step S108, the server apparatus can perform a human face identification operation on the human face block according to contents stored in the server database (step S110). Among them, the server database includes contents corresponding to each registered employee or person, and the registered employees or people in the server database can be the same or different from the registered employees or people in the client database. Similarly, during the human face identification operation, image features obtained from the human face block are compared with the contents in the server database. After the comparison, as long as the image features of the human face block are highly similar to any one content in the server database (for example, 88% or 92% similar), it can be determined that the human face appearing in the human face block is the face of the registered employee or person related to this one content (that is, the human face identification can obtain an effective result). On the contrary, if the image features obtained from the human face block are not highly similar to any content in the server database, then it can be determined that the human face appearing in the human face block is not related to the registered employees or people registered in the server database.

When performing the human face identification operations in step S110, the server apparatus can also check whether the human face identification operations obtain an effective result (step S112), and when an effective result is obtained, copy the data of the corresponding registered employee or person to the client database (step S114). Further, the client apparatus can output the corresponding result according to the data of the registered employee or person obtained from the server apparatus (step S106). On the other hand, when all the human face identification operations performed do not obtain an effective result, the server apparatus determines that the employee or person represented by this human face block is an unregistered stranger (step S116), and transmits the result of the determination to the client apparatus so that the client apparatus can output the corresponding result (step S106). Similarly, although the server apparatus in this embodiment compares the human face block with all the contents in the server database before determining whether an effective result is obtained, those skilled in the art should know that any method is applicable to this as long as it can accomplishing the above functions, and the present disclosure does not have to be limited to the details of this embodiment.

In a practical application, multiple client apparatuses can be set up respectively in different departments of a company and a server apparatus can be set up in the main computer room of the company, wherein the client database corresponding to each of the client apparatuses store the face registration data of the employees in the corresponding department, and the server database corresponding to the server apparatus stores the face registration data of all the employees in the company. In this way, in normal times, the client apparatus of each department can be used to identify the employees entering and leaving the department, and when visited by employees of the other departments or outside the company, the server apparatus can be used for further face identification to confirm the identity of the visiting employees.

It is worth mentioning that although the above embodiment only describes a two-stage face identification method, those skilled in the art should know that the above-mentioned technology can be applied to face identification operations with more stages after simple modifications. Therefore, the present disclosure is not limited to two-stage face identification operations.

Figure 2:
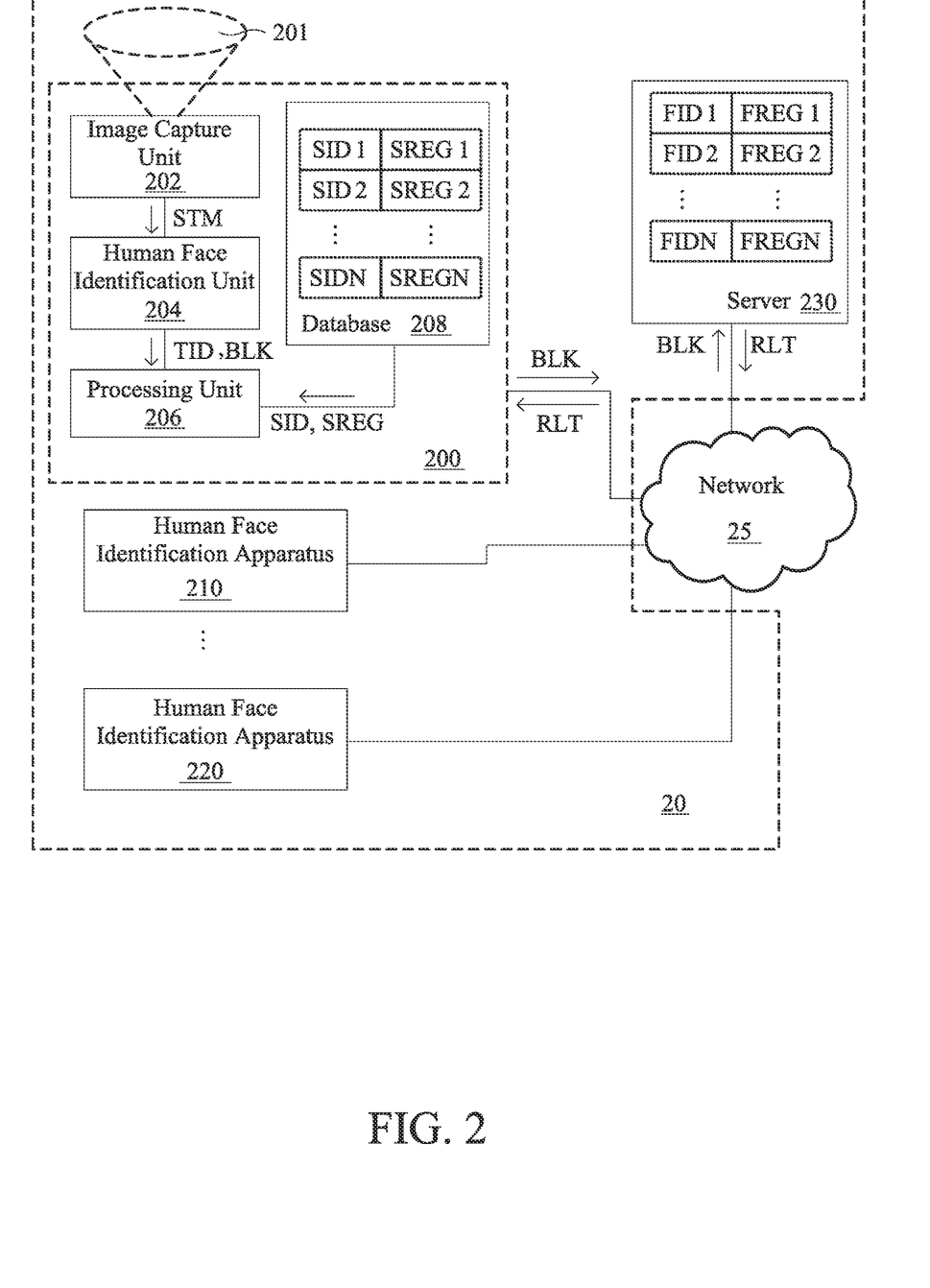
FIG. 2 is a block diagram of the system architecture of a distributed human face identification system according to an embodiment of the present disclosure.

In order to make the technology of the present disclosure clearer and easier to understand, the following is a further description with reference to FIG. 2. FIG. 2 is a block diagram of the system architecture of a distributed human face identification system according to an embodiment of the present disclosure. As shown in FIG. 2, the distributed human face identification system 20 in this embodiment includes human face identification apparatuses 200, 210 . . . 220 and a server 230. These human face identification apparatuses 200-220 are electrically coupled or connected to the server 230 via the network 25 so that the human face identification apparatuses 200-220 can complete data transfer operations with the server 230, respectively. The network 25 can be a wired network or a wireless network. Those skilled in the art should know that the human face identification apparatuses 200-220 shown in FIG. 2 can be implemented using the same, similar or completely different architectures (that is, human face identification apparatuses 200-220 from different manufacturers). The different architectures mentioned here include different hardware structures or different software or algorithms used. The human face identification apparatuses 200-220 do not have to use the same human face feature model or algorithm, as long as the human face identification apparatuses 200-220 transmit human face images with resolutions and human face ranges complying with the analysis range and the requirements of the server 230 to the server 230. In the following, the human face identification apparatus 200 and the server 230 are used as an example for detailed description, and the manners of operation of the other human face identification apparatuses will not be described one by one.

As shown in FIG. 2, the human face identification apparatus 200 includes an image capture unit 202, a human face identification unit 204, a processing unit 206, and a database 208. In an embodiment, the human face identification unit 204 can be connected to the image capture unit 202 via a wired network or a wireless network, the processing unit 206 can be connected to the human face identification unit 204 via a wired network or a wireless network, and the processing unit 206 can be connected to the database 208 via a wired network or a wireless network.

The server 230 stores many records of human face identification data (hereinafter also referred to as the server human face identification data) FID1, FID2 . . . FIDN. Each human face identification data FID1, FID2 . . . FIDN corresponds to a record of data of a registered employee (hereinafter also referred to as the data of a server registered person) FREG1, FREG2 . . . FREGN. It should be noted that there may be only one record of the server human face identification data, so those skilled in the art should know that the number of records of the above data is not a restriction when implementing the present disclosure. At the same time, the database 208 also stores multiple records of human face identification data (hereinafter also referred to as the client human face identification data) SID1, SID2 . . . SIDN. Each human face identification data SID1, SID2 . . . SIDN corresponds to a record of data of a registered employee (hereinafter also referred to as the data of a client registered person) SREG1, SREG2 . . . SREGN. Similarly, there may be only one record of the client human face identification data, so those skilled in the art should know that the number of records of the data above is not a restriction when implementing the present disclosure. In one embodiment, the client human face identification data SID1, SID2 . . . SIDN stored in the database 208 of each of the human face identification apparatuses 200-220 is a subset of the server human face identification data FID1, FID2 . . . FIDN stored in the server 230.

In this embodiment, the image capture unit 202 is electrically coupled or connected to the human face identification unit 204. The image capture unit 202 can generate an image stream STM based on multiple images obtained from a video of a specific area 201 in a continuous time period. The video can be generated by an external stand-alone camera or a network video recorder (NVR) system continuously shooting the specific area 201.

In an embodiment, the image capture unit 202 obtains the video or the images for generating the image stream STM directly from the camera or the NVR system.

In another embodiment, the camera or the NVR system transmits the video or the images to a storage unit. The storage unit stores the video or the images. The image capture unit 202 obtains the video or the images for generating the image stream STM from the storage unit.

In yet another embodiment, the camera or the NVR system transmits the video to the storage unit. The storage unit stores the video. The image capture unit 202 obtains the images for generating the image stream STM from the video stored in the storage unit.

The aforementioned storage unit can be a part of the camera or the NVR system, an external stand-alone hardware device, or a part of the image capture unit 202.

In an embodiment, the storage unit is an external stand-alone hardware device, and the storage unit, the camera and the NVR system are all connected to the network 25.

The image capture unit 202 sends the image stream STM to the human face identification unit 204. After receiving the image stream STM, the human face identification unit 204 starts to detect whether a human face block BLK is included in each image (a human face block BLK is an image region that includes a human face), and determines whether the human face blocks BLK in the images belong to the same identification object (the specific identification method is disclosed in the Taiwan Patent No. 109121029 filed by the applicant, which is incorporated herein and will not be repeated here). Next, the human face identification unit 204 performs a human face identification operation on the human face blocks BLK belonging to the same identification object to generate a corresponding human face identification data (hereinafter also referred to as the validating human face identification data) TID, and the human face identification unit 204 sends the generated human face identification data TID and the corresponding human face blocks BLK to the processing unit 206. The validating human face identification data TID is temporary because it can be replaced later with a corresponding stranger number or data of a server registered person included in the comparison result output by the server 230 that is stored in the database 208.

As shown in FIG. 2, the processing unit 206 is electrically coupled or connected to the human face identification unit 204 and the database 208. By electrically coupling or connecting to the human face identification unit 204, the processing unit 206 can obtain the human face identification data TID and the corresponding human face blocks BLK generated by the human face identification unit 204. By electrically coupling or connecting to the database 208, the processing unit 206 can obtain the human face identification data SID1, SID2 . . . SIDN stored in the database 208. After obtaining the human face identification data TID and the human face identification data SID1, SID2 . . . SIDN, the processing unit 206 can start the comparison operation between the human face identification data TID and the human face identification data SID1, SID2 . . . SIDN. Alternatively, in another embodiment, when the human face identification data SID1, SID2 . . . SIDN in the database 208 are images instead of image features, the human face identification unit 204 can also be further electrically coupled or connected to the database 208 to obtain the human face identification data SID1, SID2 . . . SIDN and convert the human face identification data SID1, SID2 . . . SIDN into image features and then forward the image features to the processing unit 206 for the comparison of the human face identification data.

During the comparison of the human face identification data, the processing unit 206 has the chance to find that the similarity value between the human face identification data TID and one of the human face identification data SID1, SID2 . . . SIDN (the human face identification data SIDN is taken as an example below) exceeds a preset standard value (hereinafter also referred to as the client threshold, such as 70%, 85% or 90%). In this situation, the processing unit 206 can obtain the data of registered employee SREGN corresponding to the human face identification data SIDN from the database 208, and use the data of registered employee SREGN as the identification result of the human face identification apparatus 200 and output the identification result for subsequent use.

The processing unit 206 also has the chance to find that the similarity values between the human face identification data TID and more than one of the human face identification data SID1, SID2 . . . SIDN exceed the client threshold. In this situation, the processing unit 206 can obtain the data of registered employee corresponding to the human face identification data with the highest similarity value (the data of registered employee SREGN is taken as an example below) from the database 208, and use the data of registered employee SREGN as the identification result of the human face identification apparatus 200 and output the identification result for subsequent use.

Alternatively, in the aforementioned situation, the processing unit 206 can obtain the data of the registered employees corresponding to the human face identification data with the similarity values exceeding the client threshold from the database 208, send the data of those registered employees to an administrator or a security guard for his/her reference, and then use the data of the one registered employee selected by the administrator or the security guard as the identification result of the human face identification apparatus 200 and output the identification result for subsequent use.

Of course, it is probable that the processing unit 206 does not find any human face identification data SID1, SID2 ... SIDN that has a similarity value relative to the human face identification data TID that exceeds the above-mentioned client threshold. Under such circumstances, the processing unit 206 can transmit one or more human face blocks BLK for generating the human face identification data TID to the server 230 via the network 25, and then receives a comparison result RLT returned by the server 230, and then determines the output of the human face identification apparatus 200 according to the comparison result RLT.

In this embodiment, the server 230 performs a human face identification operation on the received human face blocks BLK and generates a corresponding human face identification data (hereinafter also referred to as the reference human face identification data). Next, the server 230 compares the reference human face identification data with the previously stored human face identification data FID1, FID2 ... FIDN, and transmits the comparison result RLT obtained from the comparison to the human face identification apparatus 200.

Specifically, during the comparison of the human face identification data, the server 230 has the chance to find that the similarity value between the reference human face identification data and one of the human face identification data FID1, FID2 ... FIDN (the human face identification data FIDN is taken as an example below) exceeds the preset standard value (hereinafter also referred to as the server threshold, which can be the same value as the client threshold or another value different from the client threshold). In this situation, the server 230 can obtain the data of registered employee FREGN corresponding to the human face identification data FIDN from the data stored in advance, and use the data of registered employee FREGN as a part of the comparison result RLT and transmits the comparison result RLT to the human face identification apparatus 200.

The server 230 also has the chance to find that the similarity values between the reference human face identification data and more than one of the human face identification data FID1, FID2 ... FIDN exceed the server threshold. In this situation, the server 230 can obtain the data of registered employee corresponding to the human face identification data with the highest similarity value (the data of registered employee FREGN is taken as an example below) from the data stored in advance, and use the data of registered employee FREGN as a part of the comparison result RLT and transmits the comparison result RLT to the human face identification apparatus 200.

Alternatively, in the aforementioned situation, the server 230 can obtain the data of registered employees corresponding to the human face identification data with the similarity values exceeding the server threshold from the data stored in advance, send the data of those registered employees to an administrator or a security guard for his/her reference, and then use the data of the one registered employee selected by the administrator or the security guard (the data of registered employee FREGN is taken as an example below) as a part of the comparison result RLT and transmits the comparison result RLT to the human face identification apparatus 200.

In an embodiment, the server 230 can transmit the comparison result RLT to a storage unit connected to the human face identification apparatus 200 through the network 25, which can be a wired network or a wireless network. The storage unit can store the comparison result RLT temporarily as a buffer or permanently as a record, and then the storage unit forwards the comparison result RLT to the human face identification apparatus 200.

The aforementioned storage unit storing the video or the images for generating the image stream STM and the aforementioned storage unit storing the comparison result RLT can be the same storage unit or different storage units.

After receiving the comparison result RLT including the data of registered employee FREGN, the human face identification apparatus 200 stores the data of registered employee FREGN included in the comparison result RLT in the database 208 so that a corresponding content is added in the database 208. This content added to the database 208 should include a human face identification data (given the label SIDX hereinafter, not shown in the drawings) and the data of registered employee (given the label SREGX hereinafter, not shown in the drawings) corresponding to the human face identification data SIDX. In an embodiment, the human face identification data SIDX can be the human face blocks BLK previously transmitted to the server 230, or can be the human face identification data TID obtained from the human face blocks BLK through the feature extraction of the human face identification unit 204. In this case, the data of registered employee FREGN provided by the server 230 through the comparison result RLT does not have to include the face image of the corresponding registered employee. Alternatively, in another embodiment, the data of registered employee FREGN provided by the server 230 through the comparison result RLT may include the face image of the corresponding registered employee.

In an embodiment, the validating human face identification data generated based on the human face blocks BLK by the human face identification unit 204 is different from the reference human face identification data generated based on the human face blocks BLK by the server 230, and the validating human face identification data is generated by an algorithm different from that generating the reference human face identification data.

In another embodiment, the validating human face identification data generated based on the human face blocks BLK by the human face identification unit 204 is the same as the reference human face identification data generated based on the human face blocks BLK by the server 230, and the validating human face identification data and the reference human face identification data are generated by the same algorithm.

If the server 230 cannot find any human face identification data FID1, FID2 ... FIDN that has a similarity value relative to the reference human face identification data that exceeds the above-mentioned server threshold during the human face identification, then the server 230 can indicate in the identification result RLT that the visiting employee cannot be identified, and the human face identification apparatus 200 can generate a corresponding output results accordingly for subsequent use. Furthermore, in addition to indicating in the identification result RLT that the visiting employee cannot be identified, the server 230 can also provide a number (hereinafter referred to as the stranger number) in the identification result RLT, thus the human face identification apparatus 200 receiving the identification result RLT can associate the stranger number with the corresponding human face blocks BLK and store the stranger number and the corresponding human face blocks BLK in the database 208 to become a content in the database 208. Alternatively, in another embodiment, the stranger number and the corresponding human face blocks BLK can also be stored together in the server 230 to become a new content. Alternatively, the aforementioned stranger number may be provided by the human face identification apparatus 200 instead of the server 230. Those skilled in the art should know that fine-tuning can be made according to the above technical spirit, so the implementation possibility of the present disclosure is not limited to specific details of the aforementioned embodiment.

The aforementioned content added to the database 208 based on the identification result RLT of the server 230 can be deleted after a preset period of time. Base on the aforementioned example wherein multiple client apparatuses are respectively set up in different departments of the company and a server apparatus is set up in the main computer room of the company, the content added to the database 208 can allow temporary visitors who do not belong to the corresponding department to obtain permissions to enter and leave that department within the preset period of time, and after the preset period of time, temporary visitors have to register again to obtain permissions to enter and leave that department. Therefore, cooperating with common review mechanism of newly added database contents, the technology proposed by the present disclosure can be used to build a very flexible human face identification entrance control system.

The human face identification apparatus, the distributed human face identification system and the corresponding method provided by the present disclosure are useful in many fields, such as entrance control, car access control and apparatus access control.

For example, a door controller can be connected between a human face identification apparatus 200-220, a door and a camera near the door. When a person stands before the door, the camera takes images of the face of the person and the human face identification apparatus 200-220 attempts to identify the person based on the images. When the human face identification apparatus 200-220 or the server 230 can effectively identify the person, the door controller can receive the result output by the human face identification apparatus 200-220 and opens the door in response to the result.

For another example, a human face identification apparatus 200-220, a car controller and a camera can be installed in a car. The database 208 of the human face identification apparatus 200-220 stores client human face identification data corresponding to data of client registered people (the owner of the car and his/her family members). The server 230 stores server human face identification data corresponding to data of server registered people (maintenance technicians of the manufacturer of the car). When a person is near the car or in the car, the camera takes images of the face of the person and the human face identification apparatus 200-220 attempts to identify the person based on the images. When the person is the owner or his/her family member, the human face identification apparatus 200-220 can effectively identify the person, therefore the car controller can receive the result output by the human face identification apparatus 200-220 and opens a door of the car or starts an engine or a motor of the car in response to the result.

When the human face identification apparatus 200-220 cannot effectively identify the person, the human face identification apparatus 200-220 transmits a human face block BLK of the person to the server 230, and then the server 230 attempts to identify the person based on the human face block BLK. When the person is a maintenance technician, the server 230 can effectively identify the person, therefore the car controller can receive the result output by the human face identification apparatus 200-220 and opens a door of the car or starts an engine or a motor of the car in response to the result.

In an embodiment, the car controller can provide a user interface for the owner to set whether server registered people are allowed to access the car. When the server registered people are not allowed to access the car and the human face identification apparatus 200-220 cannot effectively identify the person, the human face identification apparatus 200-220 does not transmit any human face block BLK to the server 230 and the car remain closed or un-started.

For another example, the car can be replaced with an apparatus in a factory and the client register people can be replaced with engineers working with the apparatus. An access controller can be connected to the apparatus and a camera can be installed on or near the apparatus. The human face identification apparatus 200-220 and the server 230 can attempt to identify a person based on images of the face of the person taken by the camera. When the human face identification apparatus 200-220 or the server 230 can effectively identify the person, the access controller can receive the result output by the human face identification apparatus 200-220 and allow the person to access the apparatus in response to the result.

In view of above, the human face identification apparatus, the distributed human face identification system and the corresponding method provided by the present disclosure adopt multi-stage identification operations, so each place where a human face identification apparatus is set up can use the local database for human face identification, and the server joins the human face identification operation only when the human face identification apparatus cannot perform effective identification. The local identification is quicker in response because the human face identification apparatus does not need to communicate with the server. Therefore, the requirements for working capacity of the server and network transmission speed can be reduced.

In addition, the data of all client/server registered people are stored in the server. By sending the human face block to the server, a human face identification apparatus can effectively identify any register person with the assistance of the server. Therefore, it is unnecessary to synchronize the data of all the registered people in each human face identification apparatus, which can reduce the volume of network data transfer.

Further, since the server performs human face identification based on the human face block provided by the human face identification apparatus instead of the validating human face identification data generated by the human face identification apparatus, the server can generate the reference human face identification data by using the same algorithm or a different algorithm from that used by the human face identification apparatus to generate the validating human face identification data. Consequently, the server and each human face identification apparatus can use different algorithms or the same algorithm, and the algorithms can be updated individually without affecting the human face identification of the other ones of the human face identification apparatuses and the server.

What is claimed is:

1. A distributed human face identification system, comprising:
   a server storing at least one server human face identification data, each of the server human face identification data being corresponding to a data of a server registered person; and
   at least one human face identification apparatus, each of the at least one human face identification apparatus being connected to the server to transfer data to the server, and each of the at least one human face identification apparatus comprising:
a database configured for storing at least one client human face identification data, each of the client human face identification data being corresponding to a data of a client registered person;
an image capture unit configured for generating an image stream, the image stream comprising images obtained from a video of a specific area in a continuous time period;
a human face identification unit connected to the image capture unit and configured for receiving the image stream, and configured for detecting whether each of the images comprises a human face block, determining, among all of the human face blocks, at least one of the human face blocks belonging to a same identification object, and performing human face identification on the at least one of the human face blocks belonging to the same identification object to generate a validating human face identification data; and
a processing unit connected to the database for obtaining the client human face identification data, connected to the human face identification unit for receiving the validating human face identification data and the image stream, and configured for comparing the validating human face identification data with the client human face identification data, and sending an output when finding that a similarity value between the validating human face identification data and one of the client human face identification data exceeds a client threshold,
wherein when the similarity value between the validating human face identification data and each of the client human face identification data does not exceed the client threshold, one of the at least one of the human face blocks belonging to the same identification object is transmitted to the server;
wherein the server performs human face identification on the received human face block to generate a reference human face identification data, compares the reference human face identification data with the server human face identification data, and then transmits a comparison result obtained therefrom.

2. The distributed human face identification system according to claim 1, wherein the server transmits the comparison result to the at least one human face identification apparatus or a storage unit connected to the at least one human face identification apparatus.

3. The distributed human face identification system according to claim 2, wherein the human face identification apparatus generates the output according to the comparison result from the server when the similarity value between the validating human face identification data and each of the client human face identification data does not exceed the client threshold.

4. The distributed human face identification system according to claim 1, wherein when a similarity value between the reference human face identification data and one of the server human face identification data exceeds a server threshold, the comparison result further comprises the data of the server registered person corresponding to the server human face identification data with the similarity value relative to the reference human face identification data exceeding the server threshold, and the human face identification apparatus stores the data of the server registered person comprised in the comparison result in the database.

5. The distributed human face identification system according to claim 4, wherein the human face identification apparatus deletes the data of the server registered person stored in the database after a preset period of time following the data of the server registered person comprised in the comparison result is stored in the database, and the data of the server registered person comprised in the comparison result comprises a face image of the server registered person.

6. The distributed human face identification system according to claim 4, wherein the at least one human face identification apparatus further comprises a first human face identification apparatus and a second human face identification apparatus, wherein the first human face identification apparatus comprises a first database, a first image capture unit, a first human face identification unit, and a first processing unit, and the second human face identification apparatus comprises a second database, a second image capture unit, a second human face identification unit, and a second processing unit, and wherein the first human face identification unit comprises a first algorithm and the second human face identification unit comprises a second algorithm.

7. The distributed human face identification system according to claim 1, wherein when the similarity value between the reference human face identification data and each of the server human face identification data does not exceed a server threshold, the human face identification apparatus stores the validating human face identification data in the database according to the comparison result to become one of the client human face identification data, and the validating human face identification data stored in the database is associated with the human face block and a stranger number.

8. The distributed human face identification system according to claim 7, wherein after the human face identification apparatus stores the validating human face identification data in the database to become one of the client human face identification data, the human face identification apparatus further deletes the validating human face identification data stored in the database after a preset period of time.

9. The distributed human face identification system according to claim 7, wherein the comparison result comprises the stranger number.

10. The distributed human face identification system according to claim 1, wherein the video is obtained from a storage unit in a network video recorder system or a storage unit in an external stand-alone camera.

11. The distributed human face identification system according to claim 10, wherein the video includes the images obtained from a camera for shooting the specific area in a continuous time period.

12. The distributed human face identification system according to claim 1, wherein the client human face identification data stored in the database of each of the at least one human face identification apparatus is a subset of the server human face identification data stored in the server.

13. The distributed human face identification system according to claim 1, wherein the validating human face identification data is different from the reference human face identification data, and wherein the validating human face identification data is generated by an algorithm different from that generating the reference human face identification data.

14. The distributed human face identification system according to claim 1, wherein the validating human face identification data is the same as the reference human face identification data, and wherein the validating human face identification data and the reference human face identification data are generated by a same algorithm.

15. The distributed human face identification system according to claim 1, wherein the at least one human face identification apparatus is connected to the server via a wired network or a wireless network.

16. The distributed human face identification system according to claim 1, wherein the human face identification unit is connected to the image capture unit via a wired network or a wireless network.

17. The distributed human face identification system according to claim 1, wherein the processing unit is connected to the database via a wired network or a wireless network.

18. A human face identification apparatus applicable for connecting to a server, the server storing at least one server human face identification data, each of the server human face identification data being corresponding to a data of a server registered person, the human face identification apparatus comprising:
- a database configured for storing at least one client human face identification data, each of the client human face identification data being corresponding to a data of a client registered person;
- an image capture unit configured for generating an image stream, the image stream comprising images obtained from a video of a specific area in a continuous time period;
- a human face identification unit connected to the image capture unit and configured for receiving the image stream, the human face identification unit detecting whether each of the images comprises a human face block, determining, among all of the human face blocks, at least one of the human face blocks belonging to a same identification object, and performing human face identification on the at least one of the human face blocks belonging to the same identification object to generate a validating human face identification data; and
- a processing unit connected to the database for obtaining the client human face identification data, and connected to the human face identification unit for receiving the validating human face identification data and the image stream, the processing unit comparing the validating human face identification data with the client human face identification data,
- wherein when a similarity value between the validating human face identification data and one of the client human face identification data exceeds a client threshold, the processing unit sends an output;
- wherein when the similarity value between the validating human face identification data and each of the client human face identification data does not exceed the client threshold, the processing unit transmits one of the at least one of the human face blocks belonging to the same identification object to the server, and determines the output according to a comparison result generated by the server.

19. A distributed human face identification method, comprising:
- obtaining a human face block from an image obtained from a video of a specific area;
- identifying the human face block according to a client database in a client apparatus;
- when a data of a person corresponding to the human face block cannot be identified according to the client database, transmitting the human face block to a server apparatus;
- identifying the human face block according to a server database in the server apparatus; and
- when the server apparatus identifies the data of the person corresponding to the human face block according to the server database, copying and storing the data of the person in the client database.

20. The distributed human face identification method according to claim 19, further comprising:
- when the server apparatus cannot identify the data of the person corresponding to the human face block according to the server database, associating a content of the human face block with a stranger number by the client apparatus; and
- after a preset period of time after copying and storing the data of the person in the client database, deleting the data of the person from the client database.

* * * * *